US007013301B2

(12) United States Patent
Holm et al.

(10) Patent No.: US 7,013,301 B2
(45) Date of Patent: Mar. 14, 2006

(54) AUDIO FINGERPRINTING SYSTEM AND METHOD (75) Inventors: Frode Holm, Santa Barbara, CA (US); Wendell T. Hicken, La Verne, CA (US)

(73) Assignee: Predixis Corporation, Monrovia, CA (US)

( * ) Notice: Subject to any disclaimer, the term of this patent is extended or adjusted under 35 U.S.C. 154(b) by 122 days.

(21) Appl. No.: 10/668,926

(22) Filed: Sep. 23, 2003

(65) Prior Publication Data

US 2005/0065976 A1    Mar. 24, 2005

(51) Int. Cl.
*G06F 17/30*   (2006.01)
(52) U.S. Cl. .............................. 707/9; 707/3; 707/102; 707/103
(58) Field of Classification Search ................ 707/100, 707/103 R, 3, 9, 102, 103; 713/170, 178
See application file for complete search history.

(56) References Cited

U.S. PATENT DOCUMENTS

| | | | |
|---|---|---|---|
| 4,807,169 A | 2/1989 | Overbeck | |
| 4,996,642 A | 2/1991 | Hey | |
| 5,233,520 A | 8/1993 | Kretsch et al. | |
| 5,583,763 A | 12/1996 | Atcheson et al. | |
| 5,644,727 A * | 7/1997 | Atkins | 705/40 |
| 5,704,017 A | 12/1997 | Heckerman et al. | |
| 5,724,567 A | 3/1998 | Rose et al. | |
| 5,749,081 A | 5/1998 | Whiteis | |
| 5,832,446 A | 11/1998 | Neuhaus | |
| 5,884,282 A | 3/1999 | Robinson | |
| 5,899,502 A | 5/1999 | Del Giorno | |
| 5,918,223 A * | 6/1999 | Blum et al. | 707/1 |
| 5,960,440 A | 9/1999 | Brenner et al. | |
| 5,963,948 A | 10/1999 | Shilcrat | |
| 5,978,766 A | 11/1999 | Luciw | |
| 5,979,757 A | 11/1999 | Tracy et al. | |
| 5,999,975 A | 12/1999 | Kittaka et al. | |
| 6,012,051 A | 1/2000 | Sammon, Jr. et al. | |
| 6,018,738 A | 1/2000 | Breese et al. | |

(Continued)

FOREIGN PATENT DOCUMENTS

EP    0 751 471 A1    1/1997

(Continued)

OTHER PUBLICATIONS

Schonberg et al. Fingerprinting and forensic analysis of multimedia, Proceeding of the 12th annual ACM international conference on Multimedia, 2004, pp. 788-795.*

(Continued)

*Primary Examiner*—Jean M. Corrielus
*Assistant Examiner*—Baoquoc N. To
(74) *Attorney, Agent, or Firm*—Christie, Parker & Hale, LLP (57) ABSTRACT An audio fingerprinting system and method. A server receives an audio fingerprint of a first audio piece, searches a database for the audio fingerprint, retrieves an audio profile vector associated with the audio fingerprint, updates user preference information based on the audio profile vector, and selects a second audio piece based on the user preference information. The audio fingerprint is generated by creating a matrix based on the frequency measurements of the audio piece, and performing a singular value decomposition of the matrix. To expedite the search of the database and to increase matching accuracy, a subset of candidates in the database is identified based on the most prominent musical notes of the audio piece, and the search is limited to the identified subset. One of the attributes of the audio profile vector is a particular audio class. An identifier for the audio class is generated based on an average of audio fingerprints of the audio pieces belonging to the audio class.

26 Claims, 7 Drawing Sheets

U.S. PATENT DOCUMENTS

| | | | |
|---|---|---|---|
| 6,020,883 | A | 2/2000 | Herz et al. |
| 6,046,021 | A | 4/2000 | Bochner |
| 6,112,186 | A | 8/2000 | Bergh et al. |
| 6,148,094 | A * | 11/2000 | Kinsella ............ 382/124 |
| 6,236,974 | B1 | 5/2001 | Kolawa et al. |
| 6,236,990 | B1 | 5/2001 | Geller et al. |
| 6,370,513 | B1 | 4/2002 | Kolawa et al. |
| 6,697,779 | B1 * | 2/2004 | Bellegarda et al. ......... 704/246 |
| 6,823,225 | B1 | 11/2004 | Sass |
| 2003/0055516 | A1 | 3/2003 | Gang et al. |

FOREIGN PATENT DOCUMENTS

| | | |
|---|---|---|
| JP | 8 063 455 | 3/1996 |
| JP | 8 064 355 | 3/1996 |

OTHER PUBLICATIONS

Reddo S. On a spatial smoothing technique for multiple source location, p. 1987, p. 709.*

A Steady Stream of New Applications . . . Institutional Distribution; Nov. 1983, 9 pages.

Co-pending U.S. Appl. No. 09/556,051; filed Apr. 21, 2000, entitled Method And Apparatus for Automated Selection Organization and Recommendation of Items Based on User Preference Topography, 84 pages.

Co-pending U.S. Appl. No. 09/885,307; filed Jun. 20, 2001, entitled Acoustical Preference Tuner, 37 pages.

Co-pending U.S. Appl. No. 09/792,343; filed Feb. 23, 2001, entitled System and Method for Creating and Submitting Electronic Shopping Lists, 101 pages.

Co-pending U.S. Appl. No. 09/885,308; filed Jun. 20, 2002, entitled System and Method for Automated Recipe Selection and Shopping List Creation, 9 pages.

Co-pending U.S. Appl. No. 10/278,636; filed Oct. 23, 2002, entitled: Automated Music Profiling and Recommendation, 70 pages.

Internet Papers: http://www.iVillage.com; IVillage.com The Women's Network—busy women sharing solutions and advice; (downloaded May 22, 2001, 11:36 AM), 6 pp.

Internet Papers: http://www.my-meals.com; Meals.com—Recipes, Cooking and Meal Planning; meals.com meal planning made easy; (downloaded May 21, 2001, 5:42 PM); 9 pp.

Internet Papers: http://www.foodfit.com; FoodFit.com: Food, Nutritional Recipes, . . . efs, Healthy Cooking and Fitness Advice; FoodF!t.com; (downloaded May 22, 2001, 9:40 AM); 7 pp.

Internet Papers: https://www.mealsforyou.com; Meals For You; (downloaded May 21, 2001, 5:37 PM); 4 pp.

Internet Papers: http://www.ourhouse.com; OurHouse.com: Everything Your House Desires; Tavolo by OurHouse.com; (downloaded May 21, 2001, 6:03 PM); 7 pp.

Internet Papers: http://www.recipezaar.com; Recipezaar—a recipe food cooking & nutritional info site—Recipezaar; (downloaded May 22, 2001, 10:06 AM); 7 pp.

Internet Papers: http://www.ucook.com; The Ultimate Cookbook; (downloaded May 22, 2001, 10:15 AM); 6 pp.

Unklesbay et al.; An automated system for planning menus for the elderly in title VII nutrition programs; Food Technology 1978, 32 (8) 80-83, 1 page.

Information Technology-Multimedia Content Description Interface-Part 4: Audio, dated Jun. 9, 2001, 119 pages.

* cited by examiner

AUDIO FINGERPRINTING SYSTEM AND METHOD

FIELD OF THE INVENTION

The present invention is generally related to automatically identifying unknown audio pieces, and more specifically, to a system and method for efficiently identifying unknown audio pieces via their audio fingerprints.

BACKGROUND OF THE INVENTION

It is often desirable to automatically identify an audio piece by analyzing the content of its audio signal, especially when no descriptive data is associated with the audio piece. Prior art fingerprinting systems generally allow recognition of audio pieces based on arbitrary portions of the piece. The fingerprints in the fingerprint database are often time-indexed to allow appropriate alignment of a fingerprint generated based on the arbitrary portion with a stored fingerprint. Time-based fingerprinting systems therefore add an additional complicating step of locating a correct segment in the fingerprint database before any comparison may be performed.

The generating and storing of time-indexed audio fingerprints are redundant if an assumption may be made as to the portion of the audio piece that will be available for fingerprinting. For example, if it is known that the audio piece to be identified will always be available from the beginning of the piece, it is not necessary to maintain time-indexed fingerprints of the audio piece for the various time slices, nor is it necessary to time-align a query fingerprint with a stored fingerprint.

Another problem encountered in prior art fingerprinting systems is that as the number of registered fingerprints in the fingerprint database increases, the time expended to obtain a match also increases.

Thus, what is needed is a fingerprinting system that provides a reliable, fast, and robust identification of audio pieces. Such a system should be configured to reduce the search space in performing the identification for a better matching accuracy and speed.

SUMMARY OF THE INVENTION

According to one embodiment, the invention is directed to a method for making choices from a plurality of audio pieces where the method includes: receiving an audio fingerprint of a first audio piece; searching a database for the audio fingerprint; retrieving an audio profile vector associated with the audio fingerprint, the audio profile vector quantifying a plurality of attributes associated with the audio piece; updating user preference information based on the audio profile vector; and selecting a second audio piece based on the user preference information.

According to another embodiment, the invention is directed to an audio fingerprinting method that includes: receiving an audio signal associated with an audio piece; obtaining a plurality of frequency measurements of the audio signal; building a matrix A based on the frequency measurements; performing a singular value decomposition on the matrix A, wherein $A=USV^T$; retrieving one or more rows of matrix $V^T$; associating the retrieved rows of matrix $V^T$ with the audio piece; and storing the retrieved rows of matrix $V^T$ in a data store.

According to another embodiment, the invention is directed to an audio indexing method that includes: receiving an audio signal of an audio piece; automatically obtaining from the audio signal a list of musical notes included in the audio piece; determining from the audio signal a prominence of the musical notes in the audio piece; selecting a pre-determined number of most prominent musical notes in the audio piece; generating an index based on the selected musical notes; and searching a database based on the generated index.

According to another embodiment, the invention is directed to a method for generating an identifier for an audio class where the method includes: selecting a plurality of audio pieces associated with the audio class; computing an audio fingerprint for each selected audio piece; calculating an average of the computed audio fingerprints; generating an average fingerprint based on the calculation; associating the average fingerprint to the audio class; and storing the average fingerprint in a data store.

According to another embodiment, the invention is directed to an audio selection system that includes: a first data store storing a plurality of audio fingerprints for a plurality of audio pieces; a second data store storing a plurality of audio profile vectors for the plurality of audio fingerprints, each audio profile vector quantifying a plurality of attributes associated with the audio piece corresponding to the audio fingerprint; means for searching the first data store for an audio fingerprint of a first audio piece; means for retrieving from the second data store an audio profile vector associated with the audio fingerprint; means for updating user preference information based on the retrieved audio profile vector; and means for selecting a second audio piece based on the user preference information.

According to another embodiment, the invention is directed to an audio fingerprinting system that includes a processor configured to: receive an audio signal associated with an audio piece; obtain a plurality of frequency measurements of the audio signal; build a matrix A based on the frequency measurements; perform a singular value decomposition on the matrix A, wherein $A=USV^T$; retrieve one or more rows of matrix $V^T$; and associate the retrieved rows of matrix $V^T$ with the audio piece. The audio fingerprint system also includes a data store coupled to the processor for storing the retrieved rows of matrix $V^T$.

According to another embodiment, the invention is directed to an audio indexing system that includes a means for receiving an audio signal of an audio piece; means for automatically obtaining from the audio signal a list of musical notes included in the audio piece; means for determining from the audio signal a prominence of the musical notes in the audio piece; means for selecting a pre-determined number of most prominent musical notes in the audio piece; means for generating an index based on the selected musical notes; and means for searching a database based on the generated index.

According to another embodiment, the invention is directed to a system for generating an identifier for an audio class where the system includes: means for computing an audio fingerprint for each of a plurality of selected audio pieces; means for calculating an average of the computed audio fingerprints; means for associating the calculated average to the audio class; and means for storing the calculated average in a data store.

According to another embodiment, the invention is directed to an article of manufacture comprising a computer readable medium having computer usable program code containing executable instructions that, when executed, cause a computer to perform the steps of: obtaining a plurality of frequency measurements of an audio signal associated with an audio piece; building a matrix A based on the frequency measurements; performing a singular value decomposition on the matrix A, wherein $A=USV^T$; retrieving one or more rows of matrix $V^T$; associating the retrieved rows of matrix $V^T$ with the audio piece; and storing the retrieved rows of matrix $V^T$ in a data store.

According to another embodiment, the invention is directed to an article of manufacture comprising a computer readable medium having computer usable program code containing executable instructions that, when executed, cause a computer to perform the steps of: automatically obtaining from an audio signal of an audio piece, a list of musical notes included in the audio piece; determining from the audio signal a prominence of the musical notes in the audio piece; selecting a pre-determined number of most prominent musical notes in the audio piece; generating an index based on the selected musical notes; and searching a database based on the generated index.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION OF THE INVENTION

Figure 1:
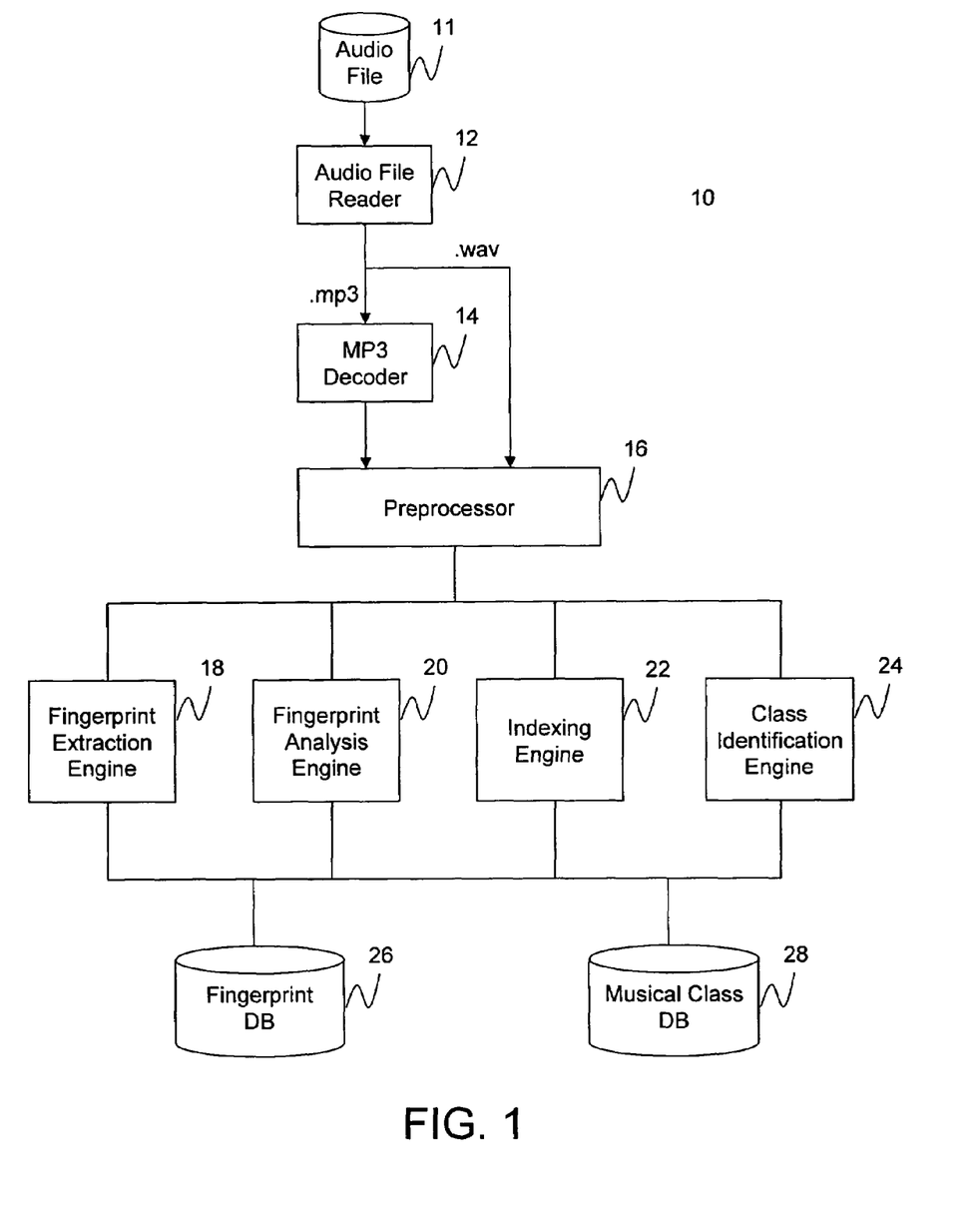
FIG. 1 is a schematic block diagram of an audio fingerprinting system according to one embodiment of the invention.

FIG. 1 is a schematic block diagram of an audio fingerprinting system 10 according to one embodiment of the invention. The system includes an audio file reader 12 for reading different types of audio files 11 or an audio input, and for outputting wave (.wav), MP3 file, or the like. The audio file reader 12 may be, for example, a CD player, DVD player, hard drive, or the like. The file reader 12 may be coupled to an MP3 decoder 14 for decoding MP3 files output by the audio file reader 12. Other types of decoders may also be used for decoding other types of encoded audio files.

The audio file 11 provided to the audio file reader 12 may be an entire audio piece or a portion of the audio piece to be recognized or registered. According to one embodiment of the invention, the audio file contains at least the first thirty seconds of the audio piece. A person of skill in the art should recognize, however, that shorter or longer segments may also be used in alternative embodiments.

The received audio file 11 is transmitted to a music preprocessor 16 which, according to one embodiment of the invention, is configured to take certain pre-processing steps prior to analysis of the audio file. Exemplary pre-processing steps may include normalizing the audio signal to ensure that the maximum level in the signal is the same for all audio samples, transforming the audio data from stereo to mono, eliminating silent portions of the audio file, and the like. A person skilled in the art should recognize, however, that the pre-processing step may be eliminated or may include other types of audio pre-processing steps that are conventional in the art.

The preprocessor 16 is coupled to a fingerprint extraction engine 18, fingerprint analysis engine 20, indexing engine 22, and class identification engine 24. According to one embodiment of the invention, the engines are processors that implement instructions stored in memory. A person of skill in the art should recognize, however, that the engines may be implemented in hardware, firmware (e.g. ASIC), or a combination of hardware, firmware, and software.

According to one embodiment of the invention, the fingerprint extraction engine 18 automatically generates a compact representation, hereinafter referred to as a fingerprint of signature, of the audio file 11, for use as a unique identifier of the audio piece. According to one embodiment of the invention, the audio fingerprint is represented as a matrix.

The fingerprint analysis engine 20 analyzes an audio fingerprint generated by the fingerprint extraction engine 18 for a match against registered fingerprints in a fingerprint database 26. Based on the match, either the fingerprint analysis engine or a separate engine coupled to the fingerprint analysis engine (not shown) retrieves additional data associated with the audio piece. The additional data may be, for example, an audio profile vector that describes the various attributes of the audio piece as is described in further detail in U.S. patent application Ser. No. 10/278,636, filed on Oct. 23, 2002, the content of which is incorporated herein by reference. Of course, a person of skill in the art should recognize that other types of data may also be associated with the audio piece, such as, for example, title information, artist or group information, concert information, new release information, and/or links, such as URL links, to further data.

The indexing engine 22 associates the extracted audio fingerprint with an index that may be used by the fingerprint analysis engine 20 to identify a subset of candidates in the fingerprint database 26. According to one embodiment of the invention, the index is generated based on the prominent musical notes contained in the audio piece. Once the index is generated, a subset of audio fingerprints in the fingerprint database 26 to which the audio piece belongs may be identified.

The class identification engine 24 generates identifiers for different sets of audio pieces that belong to particular musical classes. According to one embodiment of the invention, the audio pieces in a particular musical class are similar in terms of overall instrumentation/orchestration. For example, an exemplary musical class may be identified as including a jazz piano trio, acappella singing, acoustic guitar, acoustic piano, solo acoustic guitar with vocal, or the like. The various musical classes may then be included as attributes of an audio profile vector where a values set for a particular musical class attribute indicates how close or far the audio piece is to the musical class. The identifiers and information about the various musical classes may then be stored in a musical class database 28.

The fingerprint database 26 stores a plurality of fingerprints of known audio pieces. The fingerprints may be grouped into discrete subsets based on the musical notes contained in the audio pieces. Each audio fingerprint may be associated with the actual audio file, an audio profile vector, a description of the audio piece (e.g. title, artist and/or group), concert information, new release information, URL links to additional data, and/or the like.

Figure 2:
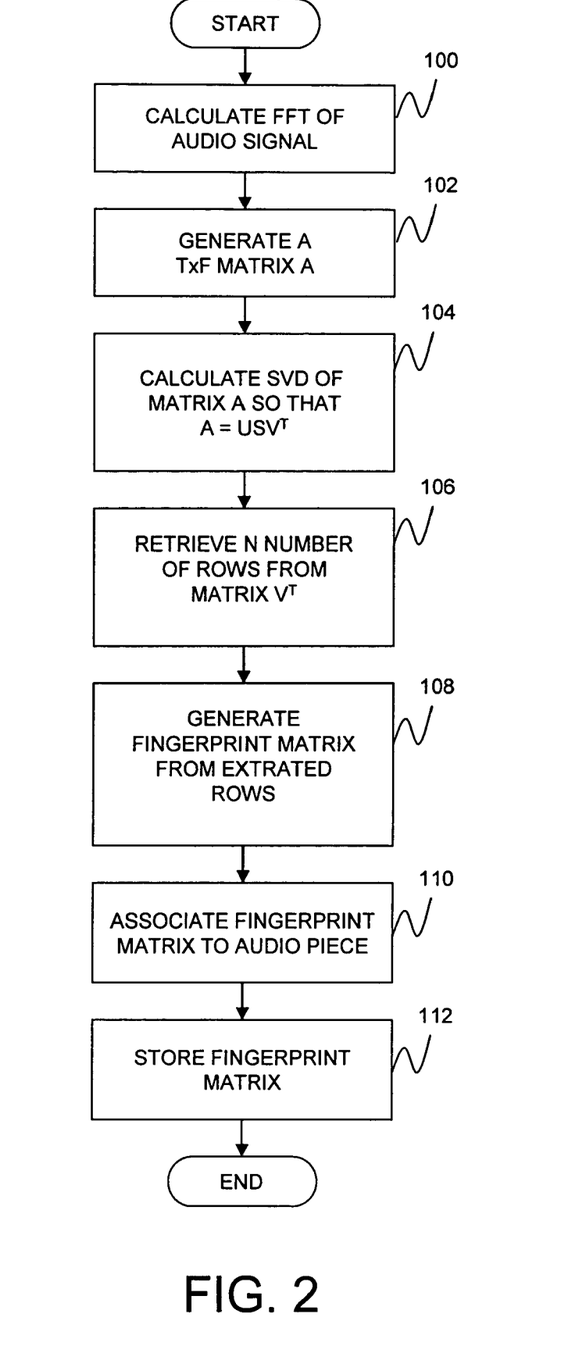
FIG. 2 is a flow diagram of a process for generating an audio fingerprint according to one embodiment of the invention.

FIG. 2 is a flow diagram of a process for generating an audio fingerprint according to one embodiment of the invention. The process starts, and in step 100, the fingerprint extraction engine 18 or a separate fourier transform engine (not shown) calculates a Fast Fourier Transform (FFT) or the like, of the audio signal of the preprocessed audio piece for transforming the signal waveform in the time domain into a signal in the frequency domain. According to one embodiment of the invention, the FFT analysis is resampled to reduce the size of the data for subsequent processing.

Based on the FFT calculation, the fingerprint extraction engine 18 generates, in step 102, a T×F matrix A, where T≧F. According to one embodiment of the invention, the rows of the matrix represent time, and the columns of the matrix represent frequency measurements, also referred to as bins, of the FFT.

In step 104, the fingerprint extraction engine 18 performs the well known matrix operation known as a Singular Value Decomposition (SVD) operation on matrix A. In general terms, SVD is a technique that reduces an original matrix into a product of three matrices as follows:

$$SVD(A) = USV^T$$

where U is a T×F orthogonal matrix, S is an F×F diagonal matrix with positive or zero valued elements, and $V^T$ is the transpose of an F×F orthogonal matrix. According to one embodiment of the invention, the rows of V transposed are the coordinates that capture the most variance, that is, retain the most information about the audio piece in decreasing order of significance as measured by the diagonal entries of the S matrix.

In step 106, the fingerprint extraction engine 18 extracts a predetermined number of rows from the matrix $V^T$ and in step 108, builds a fingerprint matrix from the extracted rows. In step 110, the fingerprint matrix is set as the audio piece's fingerprint by associating the fingerprint matrix to the audio piece in any manner that may be conventional in the art.

In step 112, the fingerprint matrix is stored in a data store. The data store is the fingerprint database 26 if the fingerprint extraction is done for registration purposes. Otherwise, the data store is a temporary storage location for storing the fingerprint matrix for later retrieval by the fingerprint analysis engine 20 for comparing against registered fingerprints.

Unlike many audio fingerprints generated by prior art systems, the audio fingerprint generated via the SVD operation has no notion of time associated with it. A person of skill in the art should recognize, however, that time may be associated with the audio fingerprint generated via the SVD operation. In other words, the process of generating audio fingerprints described with relation to FIG. 2 may be extended to a time-based audio fingerprint system by assigning a time-index to the audio fingerprint generated via the SVD operation, and repeating the process for a moving window across the entire song.

According to one embodiment of the invention, the fingerprint extraction engine 18 may also incorporate prior art fingerprinting techniques such as, for example, spectral centroid and/or spectral flatness measures which result in time-indexed fingerprint measurements. If used, the results of either or both of these measures may be added to the fingerprint matrix generated by the SVD operation.

Figure 3:
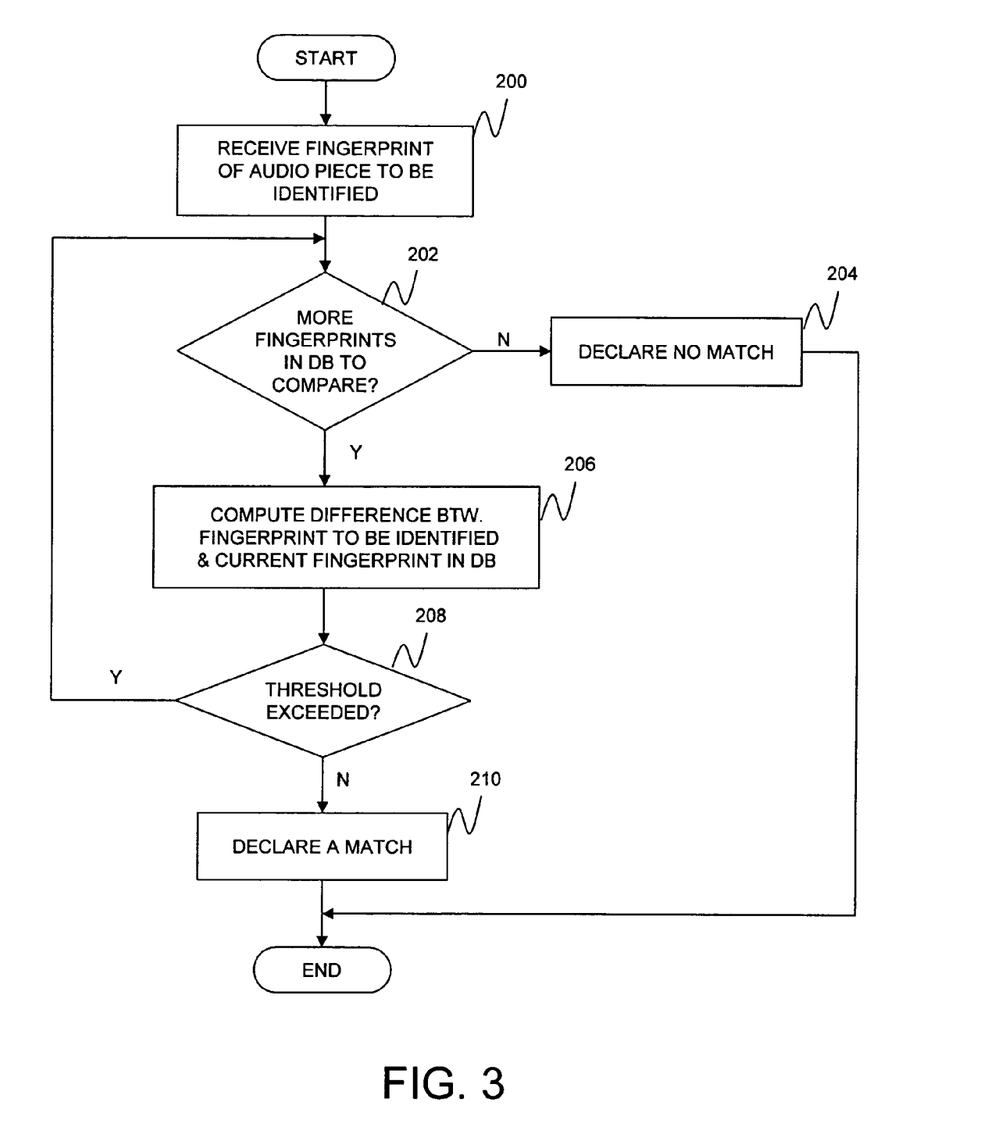
FIG. 3 is a flow diagram of a process for analyzing an extracted audio fingerprint for a match against registered fingerprints according to one embodiment of the invention.

FIG. 3 is a flow diagram of a process executed by the fingerprint analysis engine 20 for analyzing an extracted audio fingerprint for a match against registered fingerprints according to one embodiment of the invention. The process starts, and in step 200, the fingerprint analysis engine 20 receives a fingerprint (fingerprint matrix X) of an audio piece to be identified from the fingerprint extraction engine 18. The fingerprint analysis engine 20 then invokes a search and retrieval routine on the fingerprint database 26 with fingerprint matrix X. In this regard, the fingerprint analysis engine 20 inquires in step 202 whether there are more fingerprints in the fingerprint database 26 to compare. If the answer is NO, then all of the fingerprints in the database have been analyzed without finding a match. In this scenario, the fingerprint analysis engine returns a no match result in step 204.

On the other hand, if there are more fingerprints in the fingerprint database that have not been analyzed, the fingerprint analysis engine 20 computes in step 206, a difference between the fingerprint matrix X and a current fingerprint (fingerprint matrix Y) in the fingerprint database 26. According to one embodiment of the invention, the difference is computed by taking the well-known Euclidian distance measure D for each row vector of the fingerprint matrices X and Y as follows:

$$D = \sqrt{(x_1-y_1)^2 + (x_2-y_2)^2 + \ldots + (x_m-y_m)^2}$$

where X1, X2, . . . Xm are the values of a row vector of fingerprint matrix X, and Y1, Y2, . . . Ym are the values of a row vector of fingerprint matrix Y. The distance measures for all the rows of the matrices are summed and, according to one embodiment of the invention, normalized. In step 208, a determination is made as to whether the sum of the distances exceed a threshold value. If the answer is NO, a match is declared. Otherwise, a next fingerprint in the fingerprint database is examined for a match.

According to one embodiment of the invention, if prior art fingerprinting techniques are also introduced, the time-indexed vectors generated by these techniques are measured for distance against corresponding stored fingerprint vectors and scaled by an appropriate constant. The resulting distance calculation is added to the distance calculation computed in step 206. A weighing factor may also be introduced to give more or less weight to the distance calculation performed by a particular technique. The total distance computation is then tested against the threshold value to determine if a match has been made.

Figure 4:
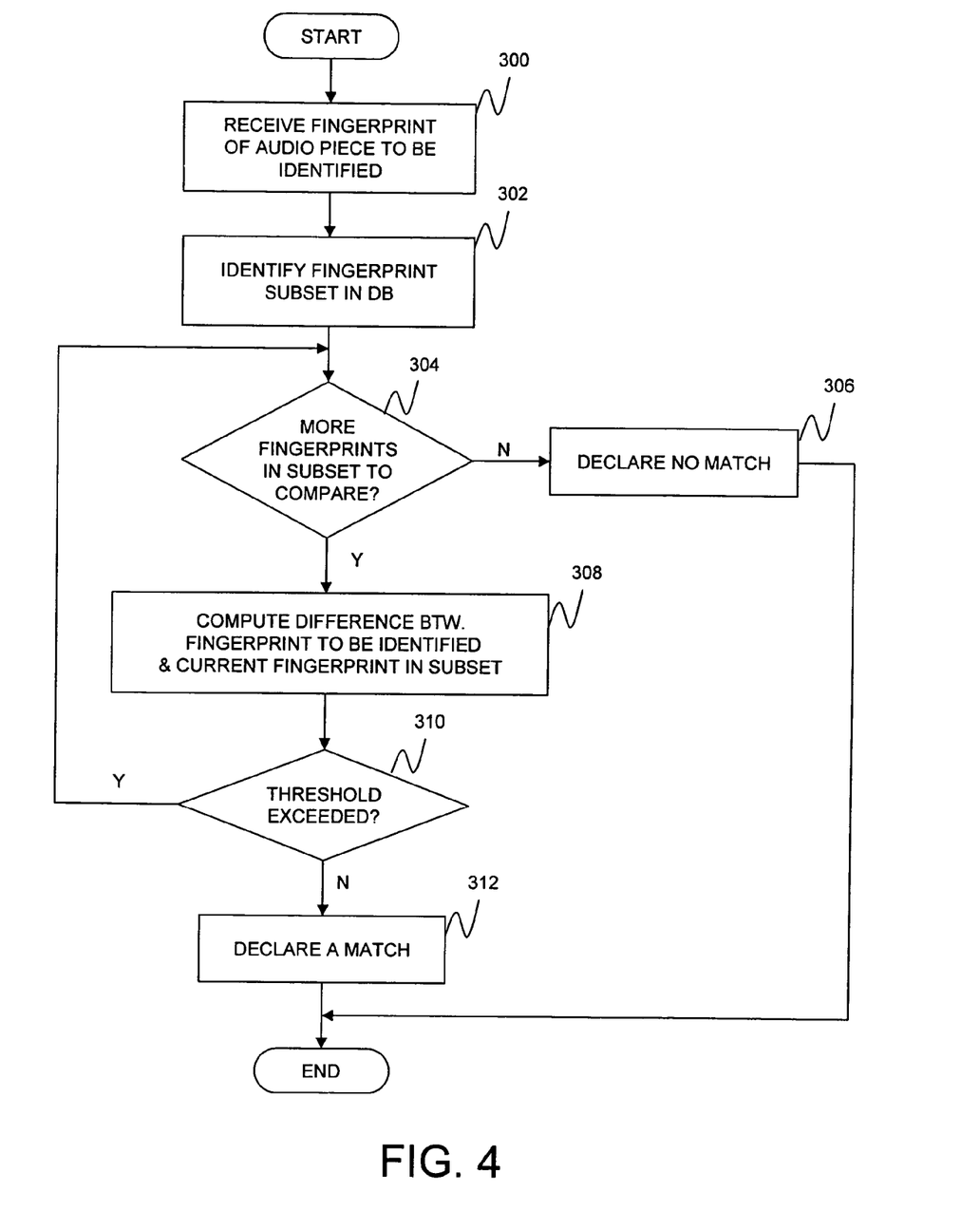
FIG. 4 is a flow diagram of a process for analyzing an extracted audio fingerprint for a match against registered fingerprints according to an alternative embodiment of the invention.

FIG. 4 is a flow diagram of a process executed by the fingerprint analysis engine 20 for analyzing the extracted audio fingerprint for a match against registered fingerprints according to an alternative embodiment of the invention.

According to this embodiment, the process starts, and in step 300, the fingerprint analysis engine 20 receives the fingerprint (fingerprint matrix X) of the audio piece to the identified from the fingerprint extraction engine 18. The fingerprint analysis engine 20 invokes the indexing engine 22 in step 302 to identify the index of a subset of fingerprints in the fingerprint database 26 that, if a candidate matching the extracted fingerprint exists, contains the candidate. In this regard, the indexing engine 22 generates a query index for the extracted fingerprint. According to one embodiment of the invention, the index consists of four unordered numbers, and a match is deemed to have been made if an index exists in the fingerprint database that has three identical numbers, in any order, as that of the query index.

The remainder of the process of FIG. 4 continues in the same manner as in FIG. 3, except that the search space is limited to the subset of fingerprints identified by the matching index.

In this regard, the fingerprint analysis engine 20 inquires in step 304 whether there are more fingerprints in the identified subset of the fingerprint database 26 to compare. If the answer is NO, the fingerprint analysis engine returns a no match result in step 306.

If there are more fingerprints in the subset that have not been analyzed, the fingerprint analysis engine 20 computes in step 308 a difference between fingerprint matrix X and a current fingerprint (fingerprint matrix Y) in the subset. In step 310, a determination is made as to whether the difference exceeds a threshold value. If the answer is NO, a match is declared. Otherwise, a next fingerprint in the identified subset is examined for a match.

Figure 5:
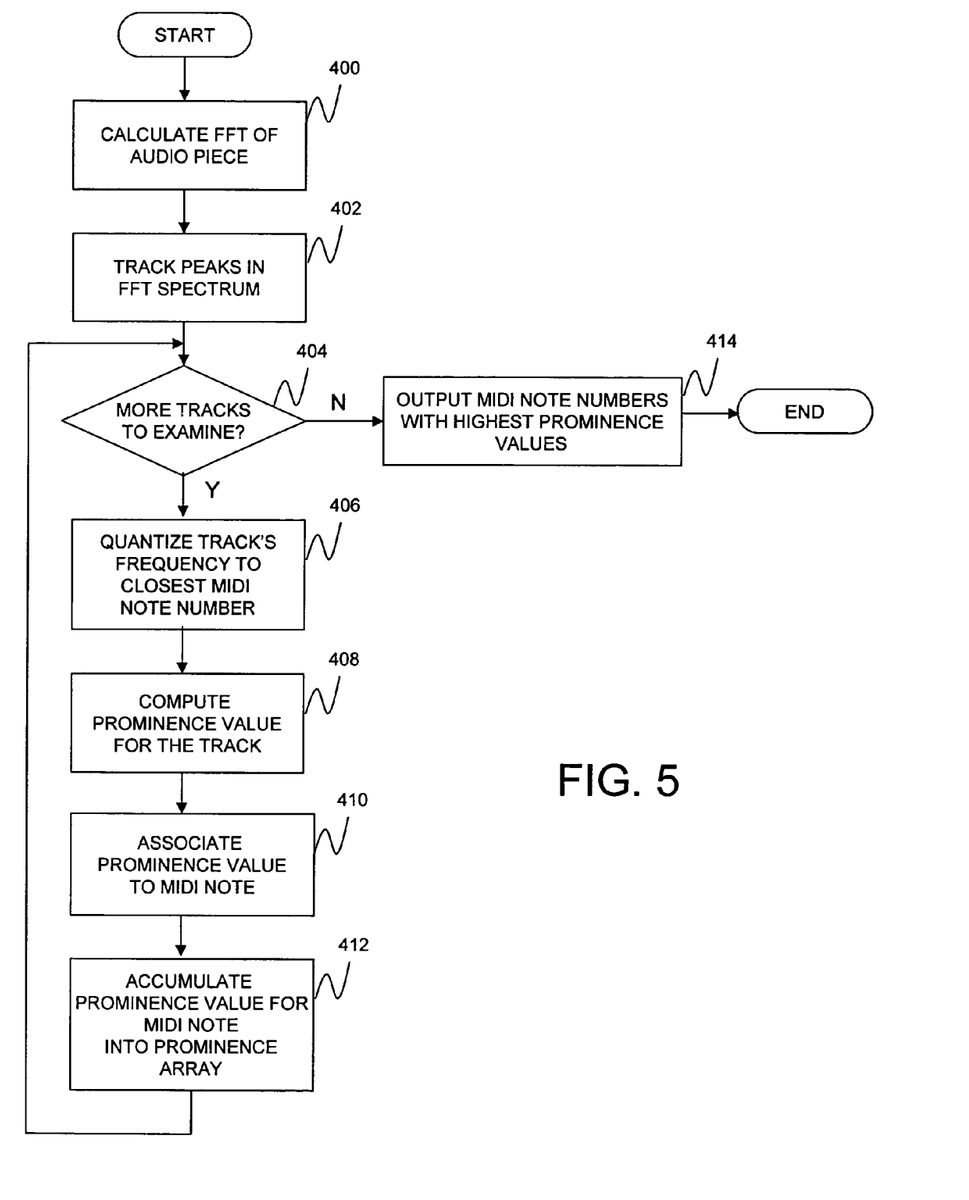
FIG. 5 is a flow diagram of a process for assigning a database index to an audio piece according to one embodiment of the invention.

FIG. 5 is a flow diagram of a process executed by the indexing engine 22 for assigning a database index to an audio piece according to one embodiment of the invention. The database index is used to identify a subset of fingerprints in the fingerprint database 26 for registering a fingerprint extracted by the fingerprint extraction engine 18, or for reducing the candidates that need to be examined in the fingerprint database 26 for a match against the extracted fingerprint.

The process illustrated in FIG. 5 starts, and in step 400, either the indexing engine 22 or a separate fourier transform engine (not shown) calculates the FFT or the like of the audio piece preprocessed by the preprocessor 16 and obtains an FFT spectrum of the audio piece. In step 402, the indexing engine 22 automatically obtains a list of notes of the audio piece. The list of notes are obtained via any of the well-known peak-tracking algorithms that exist in the prior art.

The peak-tracking algorithm generates tracks of local peaks in the FFT which are then analyzed by the indexing engine for their prominency. In this regard, the indexing engine 22 determines in step 404 whether there are any more tracks to examine. If the answer is YES, the engine converts, in step 406, the track's frequency into an integer value that quantizes the track's frequency. According to one embodiment of the invention, this is done by quantizing the track's frequency to a closest MIDI (Musical Instrument Digital Interface) note number in a manner that is well known in the art.

In step 408, the indexing engine 22 computes a prominence value for the track based on factors such as, for example, the track's strength and duration. In step 410, the engine associates the computed prominence value to the track's MIDI note. In step 412, the prominence value for the MIDI note is accumulated into a prominence array. The process then returns to step 404 for analyzing a next track.

If there are no more tracks to examine, the indexing engine 22 selects in step 414, the MIDI note numbers in the prominence array with the highest prominence values and outputs them as an index of the associated subset in the fingerprint database 26. According to one embodiment of the invention, the four MIDI note numbers with the highest prominence values are selected for the index. According to one embodiment of the invention, the index consists of four unordered numbers where the numbers are the selected MIDI note numbers, rendering a total of 24 possible combinations for the index.

Figure 6:
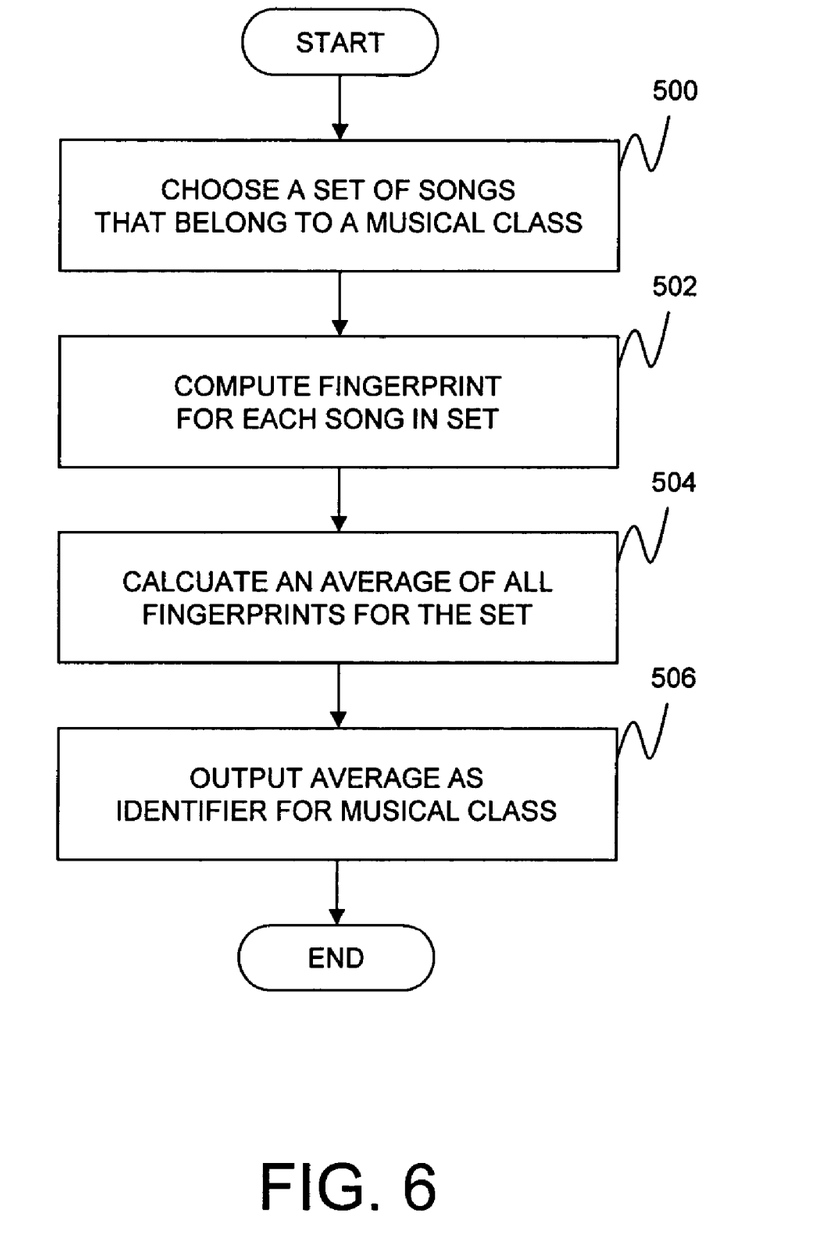
FIG. 6 is a flow diagram of a process for generating an identifier for a particular musical class according to one embodiment of the invention.

FIG. 6 is a flow diagram of a process for generating an identifier for a particular musical class according to one embodiment of the invention. Although this diagram is described in terms of the musical class, a person of skill in the art should recognize that the process extends to all types of audio and audio classes that may be conventional in the art.

The process starts, and in step 500, a set of audio pieces that belong to the musical class are selected. The selection of the pieces may be manual or automatic.

In step 502, the class identification engine computes a fingerprint for each audio piece in the set. According to one embodiment of the invention, the class identification engine invokes the fingerprint extraction engine 18 to compute the fingerprints via SVD operations. Other fingerprinting mechanisms may also be used in lieu and/or addition of the SVD fingerprinting mechanism.

In step 504, the class identification engine 24 calculates an average of the fingerprints generated for the set. In this regard, the class identification engine computes a matrix, referred to as a class ID matrix, that minimizes a distance measure to all the audio pieces in the set in a manner that is well known in the art.

In step 506, the calculated average of the fingerprints represented by the class ID matrix is associated with the musical class and in step 508, stored in the musical class database 28 as its identifier along with other information about the musical class. Such additional information may include, for example, a list of audio pieces that belong to the class, links to the fingerprint database 26 of audio fingerprints of the audio pieces that belong to the class, links to the audio profile vectors for the audio pieces that belong to the class, and/or the like.

Once the identifiers for the musical classes have been generated, calculations may be made to determine how close or far an audio piece is to a particular musical class. This may be done, for example, by computing the distance between the fingerprint extracted for the audio piece and the class ID matrix for the particular musical class.

According to one embodiment of the invention, the various musical classes are used as attributes of an audio piece's audio profile vector. The distance calculations are stored in the audio profile vector for each attribute as an indication of how close the audio piece is to the associated musical class.

Figure 7:
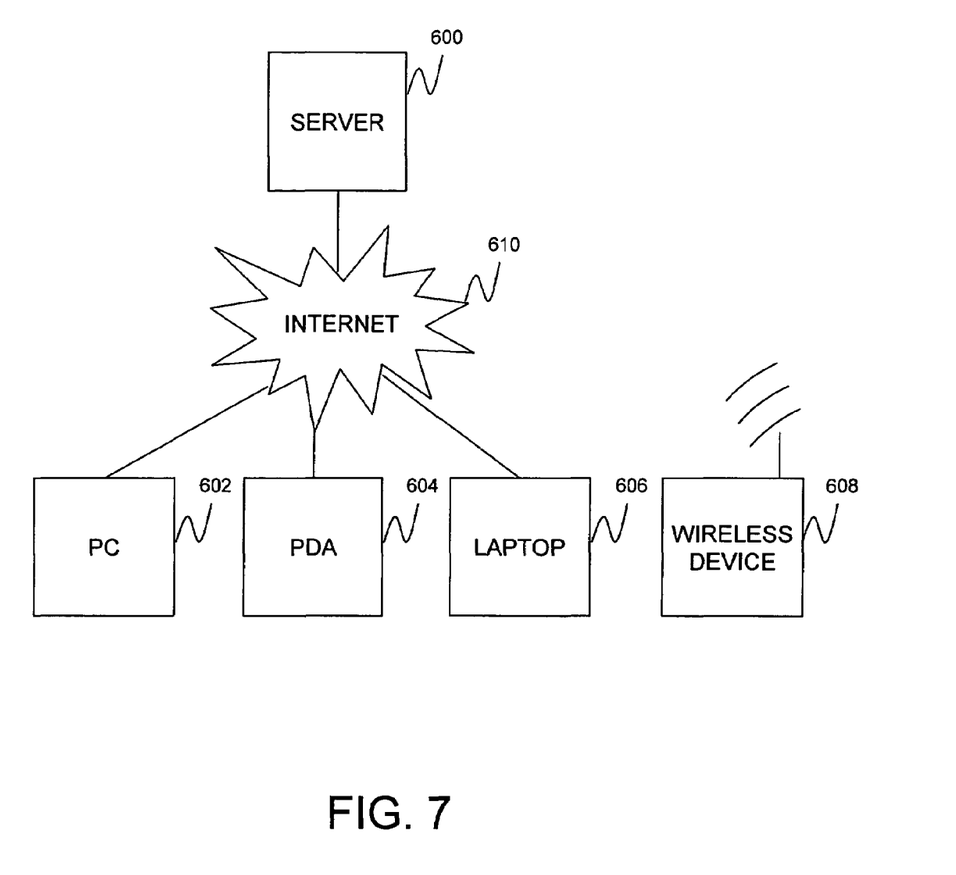
FIG. 7 is a schematic block diagram of a computer network with one or more devices utilizing the audio fingerprinting system of FIG. 1 according to one embodiment of the invention.

FIG. 7 is a schematic block diagram of a computer network with one or more devices utilizing the audio fingerprinting system 10 of FIG. 1 according to one embodiment of the invention. The network includes a server 600 coupled to one or more end terminals 602–608 over a public or private network such as, for example, the internet 610. The end terminals may take the form of personal computers 602, personal digital assistants 604, laptops 606, wireless devices 608, and/or other types of stationary or mobile terminals that are known in the art.

According to one embodiment of the invention, the audio fingerprinting system 10 resides in the server 600. Portions of the audio fingerprinting system may also reside in end terminals 602–608. The server 600 and/or end-terminals 602–608 may also include the music profiler disclosed in U.S. patent application Ser. No. 10/278,636, for automatically analyzing an audio piece and generating an audio profile vector. One or more processors included in the server 600 and/or end terminals 602–608 may further be configured with additional functionality to recommend audio pieces to users based on their preferences. Such functionality includes generating/retrieving audio profile vectors quantifying a plurality of attributes associated with the audio pieces in the audio database, generating/updating user preference vectors, and selecting audio pieces from the audio database based on the user profile vector.

In an exemplary usage of the fingerprinting system 10, a user rates a song that does not have descriptive information associated with it. Instead of transmitting the entire song that the user wants to rate, a fingerprint of the song is transmitted along with the rating information. In this regard, an end terminal used by the user accesses the server 600 and downloads an instance of the fingerprint extraction engine 18 into its memory (not shown). The downloaded fingerprint extraction engine 18 is invoked to extract the fingerprint of the audio piece that is being rated. The extracted fingerprint is transmitted to the server 600 over the internet 610.

Upon receipt of the extracted audio fingerprint, the server 600 invokes the fingerprint analysis engine 20 to determine whether the received fingerprint is registered in the fingerprint database 26. If a match is made, the server retrieves the audio profile vector associated with the fingerprint and uses it to update or generate a user profile vector for the user as is described in further detail in U.S. patent application Ser. No. 10/278,636. The user profile vector is then used to recommend other songs to the user.

If a match may not be made, the audio piece is analyzed, preferably by the end terminal, for generating the audio profile vector as is disclosed in further detail in U.S. patent application Ser. No. 10/278,636.

According to one embodiment of the invention, the end terminal may also download an instance of the indexing engine 22 for determining the index of the subset of fingerprints to which the audio piece that is being rated belongs. The indexing information is then also transmitted to the server 600 along with the fingerprint information to expedite the search of the fingerprint database 26.

Although this invention has been described in certain specific embodiments, those skilled in the art will have no difficulty devising variations to the described embodiment which in no way depart from the scope and spirit of the present invention. Moreover, to those skilled in the various arts, the invention itself herein will suggest solutions to other tasks and adaptations for other applications.

For example, the audio fingerprinting system 10 may have applications above and beyond the recognition of audio pieces for generating audio profile vectors. For example, the system 10 may be used to find associated descriptive data (metadata) for unknown pieces of music. The system 10 may also be used to identify and protocol transmitted audio program material on broadcasting stations for verification of scheduled transmission of advertisement spots, securing a composer's royalties for broadcast material, or statistical analysis of program material.

It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A computer-implemented method for audio fingerprinting comprising:

receiving an audio signal associated with an audio piece;

obtaining a plurality of frequency measurements of the audio signal;

building an N×M matrix A based on the frequency measurements;

performing a singular value decomposition on the matrix A for generating an audio fingerprint, wherein $A=USV^T$, and wherein U is an N×M orthogonal matrix, S in an M×M diagonal matrix, and $V^T$ is a transpose of an M×M orthogonal matrix;

retrieving one or more rows of matrix $V^T$; and storing the retrieved rows of matrix $V^T$ in a data store in association with the audio piece as the audio fingerprint for the audio piece, wherein a request including the retrieved rows of matrix $V^T$ is received by an application program and information stored in a database for the audio piece identified and retrieved based on the rows of matrix $V^T$ in the request.

2. The method of claim 1, wherein rows of the matrix A represent time, and columns of the matrix A represent the frequency measurements.

3. The method of claim 1, wherein the information is an audio profile vector storing acoustic analysis data for the audio piece.

4. A computer-implemented system for audio fingerprinting comprising:

an audio file reader reading an audio file storing an audio piece;

a processor coupled to the audio file reader, the processor being configured to:

obtain a plurality of frequency measurements of audio signals associated with the audio piece;

build an N×M matrix A based on the frequency measurements;

perform a singular value decomposition on the matrix A for generating an audio fingerprint, wherein $A=USV^T$, and wherein U is an N×M orthogonal matrix, S in an M×M diagonal matrix, and $V^T$ is a transpose of an M×M orthogonal matrix; and retrieve one or more rows of matrix $V^T$;

a data store coupled to the processor storing the retrieved rows of matrix $V^T$ in association with the audio piece as the audio fingerprint for the audio piece; and a database storing information for a plurality of audio pieces, wherein a request including the retrieved rows of matrix $V^T$ is received by an application program and information for the audio piece stored in the database identified and retrieved based on the rows of matrix $V^T$ in the request.

5. The system of claim 4, wherein rows of the matrix A represent time, and columns of the matrix A represent the frequency measurements.

6. The system of claim 4, wherein the information is an audio profile vector storing acoustic analysis data for the audio piece.

7. An article of manufacture comprising a computer readable medium having computer usable program code containing executable instructions that, when executed, cause a computer to perform the steps of:

obtaining a plurality of frequency measurements of an audio signal associated with an audio piece;

building an N×M matrix A based on the frequency measurements;

performing a singular value decomposition on the matrix A for generating an audio fingerprint, wherein $A=USV^T$, and wherein U is an N×M orthogonal matrix, S in an M×M diagonal matrix, and $V^T$ is a transpose of an M×M orthogonal matrix;

retrieving one or more rows of matrix $V^T$; and storing the retrieved rows of matrix $V^T$ in a data store in association with the audio piece as the audio fingerprint for the audio piece, wherein a request including the retrieved rows of matrix $V^T$ is received by an application program and information stored in a database for the audio piece identified and retrieved based on the rows of matrix $V^T$ in the request.

8. The article of manufacture of claim 7, wherein rows of the matrix A represent time, and columns of the matrix A represent the frequency measurements.

9. The method of claim 3 further comprising recommending a second audio piece based on the acoustic analysis data.

10. The method of claim 3, wherein the audio profile vector quantifies a degree of similarity of the audio piece to audio pieces classified into a particular audio class.

11. The method of claim 10 further comprising generating an identifier for the particular audio class, the generating including:

selecting audio pieces associated with the particular audio class;

computing a second audio fingerprint for each selected audio piece;

calculating an average of the computed second audio fingerprints;

associating the calculated average to the particular audio class; and storing the calculated average in a data store as the identifier of the particular audio class.

12. The method of claim 11, wherein computing of the second audio fingerprint comprises:

obtaining from a particular audio signal associated with the selected audio piece a plurality of frequency measurements;

building an N×M matrix A' based on the frequency measurements;

performing a singular value decomposition on the matrix A', wherein $A'=U'S'V^{T'}$, and wherein U' is an N×M orthogonal matrix, S' in an M×M diagonal matrix, and $V^{T'}$ is a transpose of an M×M orthogonal matrix;

retrieving one or more rows of matrix $V^{T'}$; and associating the retrieved rows of matrix $V^{T'}$ with the selected audio piece.

13. The method of claim 12, wherein rows of the matrix A' represent time, and columns of the matrix A' represent the frequency measurements.

14. The method of claim 1, further comprising generating an index of the audio piece, the generating including:

automatically obtaining from the audio signal associated with the audio piece a list of musical notes included in the audio piece;

determining from the audio signal a prominence of the musical notes in the audio piece; and selecting a pre-determined number of most prominent musical notes in the audio piece as the index.

15. The method of claim 14, wherein the selected musical notes are translated to musical note numbers, and the index includes the translated musical note numbers.

16. The method of claim 14, wherein data stored in the database is organized into one or more groups, wherein each group is identified by a particular index.

17. The method of claim 16, wherein a search of the database for the information for the audio piece limited to a group identified by the generated index.

18. The system of claim 4, wherein the processor is further configured to recommend a second audio piece based on the acoustic analysis data.

19. The system of claim 6, wherein the audio profile vector quantifies a degree of similarity of the audio piece to audio pieces classified into a particular audio class.

20. The system of claim 19, wherein the processor is further configured to generate an identifier for the particular audio class, the generating including:

selecting audio pieces associated with the particular audio class;

computing a second audio fingerprint for each selected audio piece;

calculating an average of the computed second audio fingerprints;

associating the calculated average to the particular audio class; and storing the calculated average in a data store as the identifier of the particular audio class.

21. The system of claim 20, wherein computing of the second audio fingerprint comprises:

obtaining from a particular audio signal associated with the selected audio piece a plurality of frequency measurements;

building an N×M matrix A' based on the frequency measurements;

performing a singular value decomposition on the matrix A', wherein $A'=U'S'V^{T'}$, and wherein U' is an N×M orthogonal matrix, S' in an M×M diagonal matrix, and $V^{T'}$ is a transpose of an M×M orthogonal matrix;

retrieving one or more rows of matrix $V^{T'}$; and associating the retrieved rows of matrix $V^{T'}$ with the selected audio piece.

22. The system of claim 21, wherein rows of the matrix A' represent time, and columns of the matrix A' represent the frequency measurements.

23. The system of claim 4, wherein the processor is further configured to generate an index of the audio piece, the generating including:

automatically obtaining from the audio signal associated with the audio piece a list of musical notes included in the audio piece;

determining from the audio signal a prominence of the musical notes in the audio piece; and selecting a pre-determined number of most prominent musical notes in the audio piece as the index.

24. The system of claim 23, wherein the selected musical notes are translated to musical note numbers, and the index includes the translated musical note numbers.

25. The system of claim 23, wherein data stored in the database is organized into one or more groups, wherein each group is identified by a particular index.

26. The system of claim 25, wherein a search of the database for the information for the audio piece limited to a group identified by the generated index.

* * * * *

UNITED STATES PATENT AND TRADEMARK OFFICE
CERTIFICATE OF CORRECTION

PATENT NO.       : 7,013,301 B2  
APPLICATION NO.  : 10/668926  
DATED            : March 14, 2006  
INVENTOR(S)      : Frode Holm et al.

It is certified that error appears in the above-identified patent and that said Letters Patent is hereby corrected as shown below:

On the Title Page

The title page should be deleted and substitute therefor the attached title page.

(56) References Cited  Delete "FoodF!t.com",
Other Publications, pg. 2, Col. 2  Insert --FoodFit.com--
Internet Papers; http://www.foodfit.com;...

In the Claims

| | |
|---|---|
| Column 10, line 5, Claim 1 | After "decomposition", Insert --(SVD)-- |
| Column 10, line 7, Claim 1 | Delete "wherein A", Insert --wherein SVD (A)-- |
| Column 10, line 34, Claim 4 | After "decomposition", Insert --(SVD)-- |
| Column 10, line 36, Claim 4 | Delete "wherein A", Insert --wherein SVD (A)-- |
| Column 10, line 37, Claim 4 | Delete "S in", Insert --S is-- |
| Column 10, line 47, Claim 4 | After "database", Insert --is-- |
| Column 10, line 64, Claim 7 | After "decomposition", Insert --(SVD)-- |
| Column 10, line 66, Claim 7 | Delete "wherein A", Insert --wherein SVD (A)-- |
| Column 11, line 1, Claim 7 | Delete "S in", Insert --S is-- |
| Column 11, lines 8-9, Claim 7 | Delete "in formation stored in a database for the audio piece identified", Insert --information stored in a database for the audio piece is identified-- |

UNITED STATES PATENT AND TRADEMARK OFFICE
CERTIFICATE OF CORRECTION

PATENT NO. : 7,013,301 B2
APPLICATION NO. : 10/668926
DATED : March 14, 2006
INVENTOR(S) : Frode Holm et al.

It is certified that error appears in the above-identified patent and that said Letters Patent is hereby corrected as shown below:

In the Claims (cont'd)

| | |
|---|---|
| Column 11, line 39, Claim 12 | After "decomposition", Insert --(SVD)-- |
| Column 11, line 40, Claim 12 | Delete "wherein A'", Insert --wherein SVD (A')-- |
| Column 11, line 41, Claim 12 | Delete "S' in", Insert --S' is-- |
| Column 12, line 2, Claim 17 | Delete "piece limited", Insert --piece is limited-- |
| Column 12, line 30, Claim 21 | After "decomposition", Insert --(SVD)-- |
| Column 12, line 31, Claim 21 | Delete "wherein A", Insert --wherein SVD (A)-- |
| Column 12, line 32, Claim 21 | Delete "S' in", Insert --S' is-- |
| Column 12, line 57, Claim 26 | Delete "piece limited", Insert --piece is limited-- |

Signed and Sealed this

Fourth Day of September, 2007

JON W. DUDAS
*Director of the United States Patent and Trademark Office*

United States Patent
Holm et al.

(10) Patent No.: US 7,013,301 B2
(45) Date of Patent: Mar. 14, 2006

(54) AUDIO FINGERPRINTING SYSTEM AND METHOD

(75) Inventors: Frode Holm, Santa Barbara, CA (US); Wendell T. Hicken, La Verne, CA (US)

(73) Assignee: Predixis Corporation, Monrovia, CA (US)

(*) Notice: Subject to any disclaimer, the term of this patent is extended or adjusted under 35 U.S.C. 154(b) by 122 days.

(21) Appl. No.: 10/668,926

(22) Filed: Sep. 23, 2003

(65) Prior Publication Data
US 2005/0065976 A1    Mar. 24, 2005

(51) Int. Cl.
    G06F 17/30    (2006.01)
(52) U.S. Cl. .................... 707/9; 707/3; 707/102; 707/103
(58) Field of Classification Search ............... 707/100, 707/103 R, 3, 9, 102, 103; 713/170, 178
See application file for complete search history.

(56) References Cited

U.S. PATENT DOCUMENTS

| | | |
|---|---|---|
| 4,807,169 A | 2/1989 | Overbeck |
| 4,996,642 A | 2/1991 | Hay |
| 5,233,520 A | 8/1993 | Kretsch et al. |
| 5,583,763 A | 12/1996 | Atcheson et al. |
| 5,644,727 A * | 7/1997 | Atkins ................ 705/40 |
| 5,704,017 A | 12/1997 | Heckerman et al. |
| 5,724,567 A | 3/1998 | Rose et al. |
| 5,749,081 A | 5/1998 | Whiteis |
| 5,832,446 A | 11/1998 | Neuhaus |
| 5,884,282 A | 3/1999 | Robinson |
| 5,899,502 A | 5/1999 | Del Giorno |
| 5,918,223 A * | 6/1999 | Blum et al. .............. 707/1 |
| 5,960,440 A | 9/1999 | Brenner et al. |
| 5,963,948 A | 10/1999 | Shilcrat |
| 5,978,766 A | 11/1999 | Luciw |
| 5,979,757 A | 11/1999 | Tracy et al. |
| 5,999,975 A | 12/1999 | Kittaka et al. |
| 6,012,051 A | 1/2000 | Sammon, Jr. et al. |
| 6,018,738 A | 1/2000 | Breese et al. |

(Continued)

FOREIGN PATENT DOCUMENTS

EP    0 751 471 A1    1/1997

(Continued)

OTHER PUBLICATIONS

Schonberg et al. Fingerprinting and forensic analysis of multimedia, Proceeding of the 12th annual ACM international conference on Multimedia, 2004, pp. 788-795.*

(Continued)

*Primary Examiner*—Jean M. Corrielus
*Assistant Examiner*—Baoquoc N. To
(74) *Attorney, Agent, or Firm*—Christie, Parker & Hale, LLP (57) ABSTRACT

An audio fingerprinting system and method. A server receives an audio fingerprint of a first audio piece, searches a database for the audio fingerprint, retrieves an audio profile vector associated with the audio fingerprint, updates user preference information based on the audio profile vector, and selects a second audio piece based on the user preference information. The audio fingerprint is generated by creating a matrix based on the frequency measurements of the audio piece, and performing a singular value decomposition of the matrix. To expedite the search of the database and to increase matching accuracy, a subset of candidates in the database is identified based on the most prominent musical notes of the audio piece, and the search is limited to the identified subset. One of the attributes of the audio profile vector is a particular audio class. An identifier for the audio class is generated based on an average of audio fingerprints of the audio pieces belonging to the audio class.

26 Claims, 7 Drawing Sheets